(12) United States Patent
Yin et al.

(10) Patent No.: US 10,590,936 B2
(45) Date of Patent: Mar. 17, 2020

(54) ELECTRICALLY DRIVEN PUMP AND METHOD FOR MANUFACTURING THE SAME

(71) Applicant: Hangzhou Sanhua Research Institute Co., Ltd., Hangzhou, Zhejiang (CN)

(72) Inventors: Bingjiu Yin, Zhejiang (CN); Zhiping Huang, Zhejiang (CN)

(73) Assignee: Zhejiang Sanhua Automotive Components Co., Ltd., Hangzhou, Zhejiang (CN)

( * ) Notice: Subject to any disclaimer, the term of this patent is extended or adjusted under 35 U.S.C. 154(b) by 187 days.

(21) Appl. No.: 15/200,188

(22) Filed: Jul. 1, 2016

(65) Prior Publication Data
US 2017/0037855 A1 Feb. 9, 2017

(30) Foreign Application Priority Data
Jul. 24, 2015 (CN) .......................... 2015 1 0443549

(51) Int. Cl.
*F04D 13/06* (2006.01)
*F01P 5/12* (2006.01)
(Continued)

(52) U.S. Cl.
CPC ................ *F04D 13/06* (2013.01); *F01P 5/12* (2013.01); *F04D 1/00* (2013.01); *F04D 13/064* (2013.01);
(Continued)

(58) Field of Classification Search
CPC .... F04D 13/06; F04D 29/668; F04D 13/0633; F04D 29/20; F04D 29/662; F04D 29/046;
(Continued)

(56) References Cited

U.S. PATENT DOCUMENTS

| | | | |
|---|---|---|---|
| 2,649,049 A | 8/1953 | Pezzillo et al. | |
| 2,906,208 A * | 9/1959 | White | F04D 13/0613 417/357 |

(Continued)

FOREIGN PATENT DOCUMENTS

| | | |
|---|---|---|
| CN | 2573734 Y | 9/2003 |
| CN | 1730947 A | 2/2006 |

(Continued)

OTHER PUBLICATIONS

Translation of JP311216, Katsuyama, Nov. 27, 2000.*
(Continued)

*Primary Examiner* — Devon C Kramer
*Assistant Examiner* — David N Brandt
(74) *Attorney, Agent, or Firm* — Wolf, Greenfield & Sacks, P.C.

(57) ABSTRACT

An electrically driven pump is provided, which includes a rotor assembly. The rotor assembly includes an impeller, a rotor and a shaft sleeve assembly. The impeller is arranged on one end of a shaft sleeve, and the rotor is arranged on another end of the shaft sleeve away from the end on which the impeller is mounted. The rotor includes a rotor core, a permanent magnet and a shield. The permanent magnet is arranged around an outer peripheral surface of the rotor core and fits the outer peripheral surface of the rotor core. The shield is fixed to the shaft sleeve, and an accommodating portion configured to accommodate the rotor core and the permanent magnet is formed between the shield and the shaft sleeve. The electrically driven pump has a simple structure and is easy to manufacture.

11 Claims, 4 Drawing Sheets

(51) Int. Cl.

| | | |
|---|---|---|
| *F04D 29/043* | (2006.01) | |
| *F04D 29/046* | (2006.01) | |
| *H02K 5/128* | (2006.01) | |
| *H02K 1/30* | (2006.01) | |
| *H02K 7/04* | (2006.01) | |
| *H02K 5/167* | (2006.01) | |
| *F04D 29/20* | (2006.01) | |
| *H02K 1/27* | (2006.01) | |
| *F04D 29/66* | (2006.01) | |
| *F16C 17/02* | (2006.01) | |
| *F04D 1/00* | (2006.01) | |
| *F04D 29/22* | (2006.01) | |
| *F04D 29/42* | (2006.01) | |
| *H02K 7/14* | (2006.01) | |
| *H02K 7/08* | (2006.01) | |

(52) U.S. Cl.
CPC ....... *F04D 13/0633* (2013.01); *F04D 29/043* (2013.01); *F04D 29/046* (2013.01); *F04D 29/20* (2013.01); *F04D 29/22* (2013.01); *F04D 29/426* (2013.01); *F04D 29/662* (2013.01); *F04D 29/668* (2013.01); *F04D 29/669* (2013.01); *F16C 17/02* (2013.01); *H02K 1/278* (2013.01); *H02K 1/30* (2013.01); *H02K 5/128* (2013.01); *H02K 5/1677* (2013.01); *H02K 7/04* (2013.01); *F01P 2005/125* (2013.01); *F16C 2326/01* (2013.01); *H02K 7/086* (2013.01); *H02K 7/14* (2013.01)

(58) Field of Classification Search
CPC ........ F04D 29/22; F04D 29/043; F16C 17/02; F01P 5/12; F01P 2005/125; H02K 7/04; H02K 1/278; H02K 5/128; H02K 5/1677
See application file for complete search history.

(56) References Cited

U.S. PATENT DOCUMENTS

| | | | | |
|---|---|---|---|---|
| 6,417,591 B1* | 7/2002 | Saito | ...................... | H01S 3/036 310/104 |
| 7,007,386 B1 | 3/2006 | Stover | | |
| 7,500,829 B2* | 3/2009 | Edwards | ............... | F04D 29/026 416/170 R |
| 7,786,628 B2* | 8/2010 | Childe | ...................... | A47L 5/22 310/51 |
| 8,350,432 B2* | 1/2013 | Guedes-Pinto | .......... | H02K 1/02 310/156.28 |
| 9,570,949 B2* | 2/2017 | Kamiya | .................. | H02K 1/278 |
| 9,920,764 B2* | 3/2018 | Shafer | ..................... | F04D 13/06 |
| 2003/0077191 A1* | 4/2003 | Knoll | ...................... | H02K 1/272 417/423.7 |
| 2005/0065394 A1* | 3/2005 | Spiegel | ................... | A61N 2/02 600/9 |
| 2006/0251513 A1* | 11/2006 | Kalavsky | .............. | F04D 29/426 415/206 |
| 2007/0096572 A1* | 5/2007 | Watkins | .................. | F16C 27/04 310/90 |
| 2010/0272592 A1 | 10/2010 | Chien et al. | | |
| 2011/0058759 A1 | 3/2011 | Herborth et al. | | |
| 2013/0004347 A1* | 1/2013 | Hirono | .................. | F04D 29/063 417/423.7 |
| 2014/0002931 A1 | 1/2014 | Yanagawa et al. | | |
| 2014/0239748 A1 | 8/2014 | Herz et al. | | |
| 2016/0036275 A1* | 2/2016 | Sedlak | ................... | H02K 1/278 310/156.12 |

FOREIGN PATENT DOCUMENTS

| | | | | |
|---|---|---|---|---|
| CN | 202091211 U | 12/2011 | | |
| CN | 104612987 A | 5/2015 | | |
| DE | 102010050934 A1 | 5/2012 | | |
| DE | 1020100050934 A1 * | 5/2012 | ............... | H02K 1/28 |
| EP | 1309070 A2 | 5/2003 | | |
| EP | 2461462 A2 | 6/2012 | | |
| GB | 1 320 841 A | 6/1973 | | |
| JP | S6398496 U | 6/1988 | | |
| JP | H07111751 A | 4/1995 | | |
| JP | 3112216 B2 * | 11/2000 | ............. | H02K 5/128 |
| JP | 3112216 B2 * | 11/2000 | ............. | H02K 11/00 |
| JP | 2001-119888 A | 4/2001 | | |
| JP | 2003-293991 A | 10/2003 | | |
| JP | 2008-175090 A | 7/2008 | | |
| JP | 2010242521 A | 10/2010 | | |
| JP | 2010261436 A | 11/2010 | | |
| JP | 2012139070 A | 7/2012 | | |
| JP | 2013204811 A | 10/2013 | | |
| JP | 2015-133909 A | 7/2015 | | |
| KR | 1997-0005781 | 6/1997 | | |

OTHER PUBLICATIONS

Translation of DE102010050934, Abdukvahap, May 3, 2012.*
Translation of JP311216, Katsuyama, Nov. 27, 2000 (Year: 2000).*
Translation of DE102010050934, Abdukvahap, May 3, 2012 (Year: 2012).*
Extended European Search Report for Application No. EP 16177605.9 dated Mar. 16, 2017.
Partial European Search Report for Application No. EP 16177605.9 dated Dec. 13, 2016.
Japanese Office Action for Application No. 2016-141151 dated Sep. 26, 2017.
Japanese Office Action for Application No. 2016-141151 dated May 22, 2018.
Office Action for European Application No. 16177605.9, dated May 8, 2019.
Examination Report for European Application No. 16177605.9, dated Oct. 17, 2019.

* cited by examiner

B-B

ELECTRICALLY DRIVEN PUMP AND METHOD FOR MANUFACTURING THE SAME

CROSS REFERENCE OF RELATED APPLICATION

The present application claims the priority to Chinese Patent Application No. 201510443549.2, titled "ELECTRICALLY DRIVEN PUMP", filed on Jul. 24, 2015, with the State Intellectual Property Office of the People's Republic of China, the content of which is incorporated herein by reference in its entirety.

FIELD

This application relates to a working medium circulation system of a vehicle, and particularly to an electrically driven pump in the working medium circulation system.

BACKGROUND

In recent decades, electrically driven pumps have gradually replaced the conventional mechanical pumps and are widely used in heat dissipation and heating circulation systems of vehicles. The electrically driven pumps have advantages of little electromagnetic interference, being efficient and environmental friendly, and stepless speed regulation etc., thus can meet the requirements of market well.

The electrically driven pump includes a rotor assembly, which has an effect on a hydraulic efficiency and a motor efficiency of the electrically driven pump. The structure and manufacture process of the rotor assembly have direct effects on the performance and manufacturing cost of the electrically driven pump.

Therefore, it is necessary to improve the conventional technology, to address the above technical issues.

SUMMARY

An object of the present application is to provide an electrically driven pump having a rotor assembly, which has a simple manufacturing process and a simple structure.

To achieve the above objects, the following technical solutions are adopted in the present application. An electrically driven pump is provided, which includes a first housing, a second housing, a partition, a stator assembly, a circuit board and a rotor assembly. The electrically driven pump includes a pump chamber. The pump chamber includes a space defined by the first housing and the second housing, and the partition divides the pump chamber into a dry chamber and a wet chamber. The rotor assembly is arranged in the wet chamber, and the stator assembly and the circuit board are arranged in the dry chamber. The rotor assembly includes an impeller, a rotor, and a shaft sleeve assembly. The shaft sleeve assembly includes a shaft sleeve, the impeller is arranged on one end of the shaft sleeve, and the rotor is arranged on another end of the shaft sleeve. The rotor includes a permanent magnet, a rotor core and a shield. The permanent magnet is fixed to the rotor core, and the rotor core is fixed to the shaft sleeve. An accommodating portion is formed between the shield and the shaft sleeve, and the permanent magnet is fixedly arranged in the accommodating portion.

A method for manufacturing an electrically driven pump is further provided according to the present application. The electrically driven pump includes a rotor assembly, and the rotor assembly includes a rotor, an impeller and a shaft sleeve assembly. The rotor includes a rotor core, a permanent magnet and a shield. The impeller includes an upper plate and a lower plate, and the shaft sleeve assembly includes a shaft sleeve and bearings. The manufacturing process of the rotor assembly includes following steps:

step 1, processing or preparing parts, the parts include the rotor core, the permanent magnet, the shield, the impeller, the shaft sleeve and the bearings;

step 2, assembling the parts: including assembling the rotor, where assembling of the rotor includes: fitting the rotor core with the shaft sleeve to form a tight fit between the rotor core and the shaft sleeve, fixing the permanent magnet to the rotor core, covering the shield on an outer peripheral surface of the permanent magnet, and fixing the shield to the shaft sleeve by welding; and step 3, assembling the rotor assembly, including: pressing the impeller to one end of the shaft sleeve, opposite to another end of the shaft sleeve to which the rotor is fixed, and pressing and fixing the bearings to the shaft sleeve.

The electrically driven pump according to the present application includes the rotor assembly. In the rotor assembly, an accommodating portion for accommodating the permanent magnet is formed by the shield and the outer circumferential surface of the shaft sleeve, thus can prevent the permanent magnet from being corroded by a working medium and increase a service life of the electrically driven pump. Furthermore, the rotor assembly according to the present application has a simple structure and is easy to manufacture.

DETAILED DESCRIPTION

The present application is further described in conjunction with the drawings and embodiments hereinafter.

Figure 1:
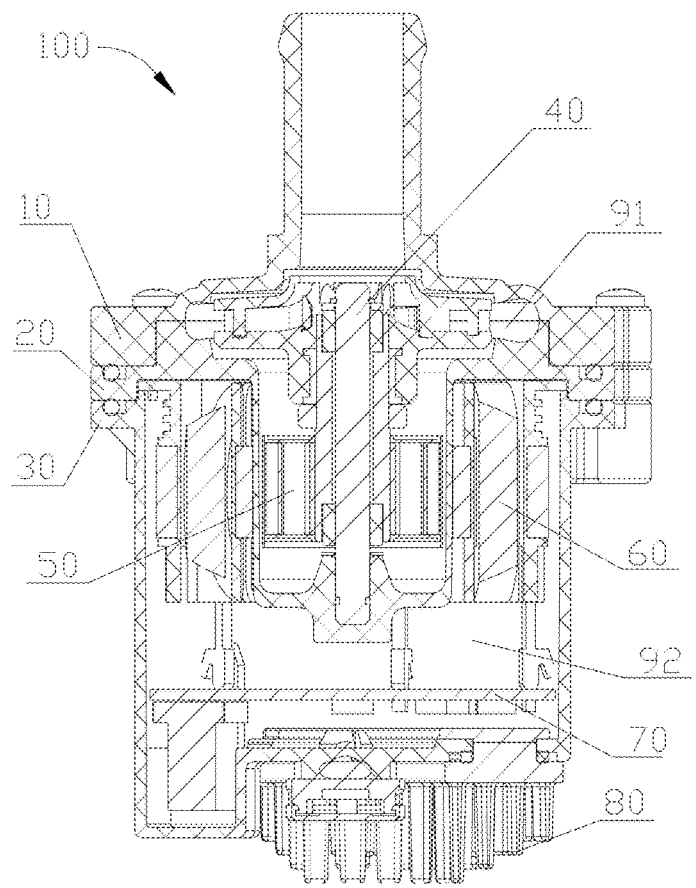
FIG. 1 is a sectional schematic view showing the structure of an electrically driven pump according to an embodiment of the present application.

FIG. 1 is a sectional schematic view showing the structure of an electrically driven pump 100. The electrically driven pump 100 is applied to a working medium circulation system, which includes a vehicle cooling circulation system. The electrically driven pump 100 includes a first housing 10, a partition 20, a second housing 30, a shaft 40, a rotor assembly 50, a stator assembly 60, a circuit board 70 and a heat dissipation assembly 80. A pump chamber includes a space defined between the first housing 10 and the second housing 30. The pump chamber is divided by the partition 20 into a wet chamber 91 and a dry chamber 92. When the electrically driven pump 100 is operating, the working medium flows through the wet chamber 91, and the rotor assembly 50 is arranged in the wet chamber 91. No working medium flows through the dry chamber 92, and the stator assembly 60 and the circuit board 70 are arranged in the dry chamber 92. The shaft 40 is fixed to the partition 20 by injection molding. The rotor assembly 50 is rotatable about the shaft 40. The rotor assembly 50 is separated from the stator assembly 60 by the partition 20. The stator assembly 60 is electrically connected to the circuit board 70. The circuit board 70 is connected to an external circuit. The heat dissipation assembly 80 is configured to transfer and dissipate heat generated by the circuit board 70, and the heat dissipation assembly 80 is fixedly mounted to the second housing 30. In this embodiment, the electrically driven pump 100 is an inner rotor type electrically driven pump, and the inner rotor type electrically driven pump is referred to as a pump in which the rotor assembly 50 is arranged to be closer to the shaft 40 than the stator assembly 60 in the case that the shaft 40 is taken as a center axis.

Figure 2:
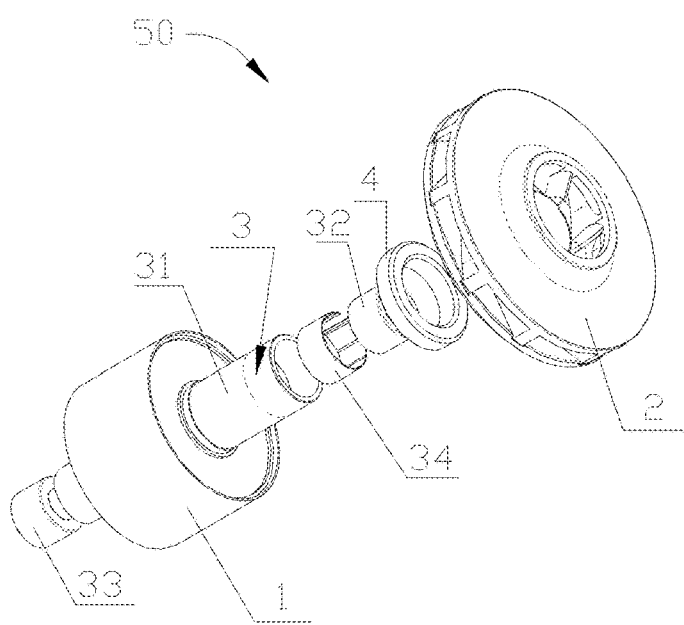
FIG. 2 is an exploded schematic view of a rotor assembly in FIG. 1.

FIGS. 2 to 10 are schematic views showing the structure of the rotor assembly 50 or components and parts of the rotor assembly 50, and FIG. 2 is an exploded view of the rotor assembly 50. Referring to FIG. 2, the rotor assembly 50 includes a rotor 1, an impeller 2, a shaft sleeve assembly 3 and a balancing sleeve 4. The shaft sleeve assembly 3 includes a shaft sleeve 31, a first bearing 32, a second bearing 33 and a buffer 34. The shaft sleeve 31 is made of a metal material, the rotor 1 is fixed to the shaft sleeve 31, and the impeller 2 is fixed to the shaft sleeve 31 by a pressing fit. The balancing sleeve 4 is sleeved on an outer circumferential surface of the shaft sleeve 31 and is arranged between the rotor 1 and the impeller 2.

Referring to FIGS. 3, 4, 5 and 6, the rotor 1 includes a rotor core 11, a permanent magnet 12, and a shield 13. The permanent magnet 12 is arranged around an outer peripheral surface of the rotor core 11. The shield 13 covers an outer peripheral surface of the permanent magnet 12, and a relatively closed accommodating portion is formed by the shield 13 and the outer circumferential surface of the shaft sleeve 31 by welding. In this embodiment, the shield 13 is made of metal, apparently, the shield may also be made of other materials Reference is made to FIG. 4. The rotor core 11 includes multiple silicon steel sheets, which are fixed by stacking and riveting. The rotor core 11 includes a mounting hole 111, a permanent magnet mounting portion 112, and multiple through holes 113. The mounting hole 111 is in a circular shape and arranged to be close to the center of the rotor core 11, the shaft sleeve 31 passes through the mounting hole 111, and a side wall of the mounting hole 111 is configured to be in a tight fit with the outer circumferential surface of the shaft sleeve 31.

In this embodiment, multiple protruding ribs 114 arranged at intervals and uniformly distributed are formed on the outer peripheral surface of the rotor core 11, and the permanent magnet mounting portion 112 is defined by a space between adjacent protruding ribs 114. The permanent magnet mounting portion 112 has a depth which is approximately half a thickness of the permanent magnet 12 and a width slightly larger than a width of the permanent magnet 12, thus may facilitate mounting of the permanent magnet 12 in the permanent magnet mounting portion 112. The permanent magnet 12 is fixed and adhered to the permanent magnet mounting portion 112 and thus is fixed to the rotor core 11.

Figure 6:
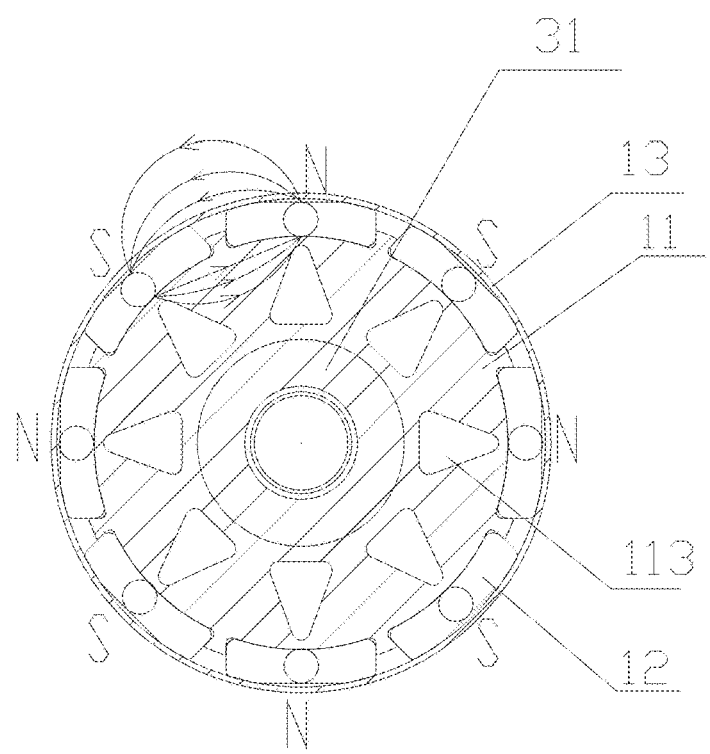
FIG. 6 is a sectional schematic view showing the structure of a rotor in FIG. 2.

In this embodiment, multiple through holes 113 are arranged to pass through two end surfaces of the rotor core 11. The through holes 113 are distributed at equal intervals around the mounting hole. The arrangement of the through holes 113 may reduce a weight and a rotational inertia of the rotor 1, thus facilitating improving of a starting performance of the rotor 1. The number of the through holes 113 is the same as the number of the permanent magnet mounting portions 112, and is same as the number of the protruding ribs 114. Reference is made to FIG. 6. A plane perpendicular to the center axis of the rotor core 11 is defined, and a section is defined by cutting the rotor core 11 using this plane. In the section, a connecting line connecting a middle point of the permanent magnet mounting portion 112 and the center of the rotor core 11 is defined, i.e., a connecting line connecting a middle point of an interval between adjacent protruding ribs 114 and the center of the rotor core 11 is defined, and each of the through holes 113 is configured to be symmetrical about the connecting line. The rotor core 11 includes a first portion 118 and a second portion 119 which are symmetrical about the connecting line. The first portion 118 and the second portion 119 extend from an inner peripheral surface of the rotor core 11 towards the outer peripheral surface of the rotor core 11. Each of the first portion 118 and the second portion 119 includes a plane, or a camber, or the combination of a plane and a camber. A circle is defined by taking the center of the rotor core as the center, the circle intersects with the first portion 118 and the second portion 119 respectively, an intersection of the circle intersecting with the first portion 118 is a first intersection, an intersection of the circle intersecting with the second portion 119 is a second intersection, and a distance between the first portion 118 and the second portion 119 at a position close to the inner circumferential surface of the rotor core is a first length L1, a distance between the first portion 118 and the second portion 119 at a position close to the outer circumferential surface of the rotor core is a second length L2, and the first length L1 is greater than the second length L2. A plane perpendicular to the center axis of the rotor core 11 is defined, and a section is defined by cutting the rotor core 11 using this plane. In the section, each through hole 113 includes a main portion and a connecting portion. In this embodiment, the main portion of each of the through holes 113 is approximately in an isosceles triangle shape, the isosceles triangle shape includes two sides, two sides of the isosceles triangle shape are chamfered, or are connected by a circular arc. Specifically, the two sides having equal length of the isosceles triangle are the main portion of the through hole 113, and the circular arc or the chamfered portion is the connecting portion of the through hole 113. Apparently, the main portion of each of the through holes 113 may also be in a trapezoid shape, and all of the shapes fall in the scope of this embodiment as long as the shapes meet the condition that the length of the arc between the first intersection and the second intersection is gradually reduced from the inner peripheral surface of the rotor core 11 to the outer peripheral surface of the rotor core 11. Distribution of magnetic lines of the permanent magnet 12 is substantially indicated by a set of line segments with arrows in FIG. 6. At a position close to the outer peripheral surface 117 of the rotor core 11, the magnetic lines of the adjacent permanent magnets 12 are concentrated and have a large density; while at the center of the rotor core, fewer magnetic force lines pass through.

Thus, the through holes 113 arranged in such a manner have little adverse effect on magnetic flux.

Figure 5:
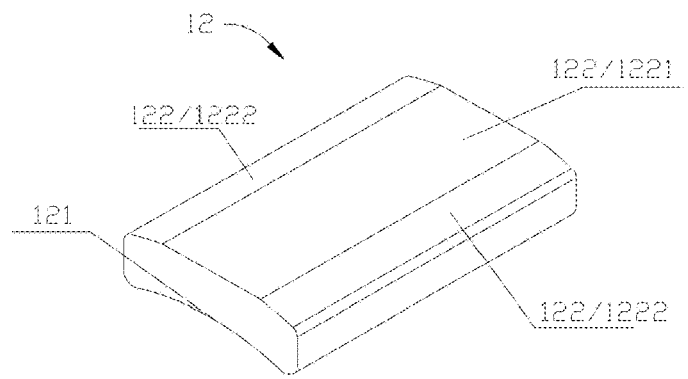
FIG. 5 is a schematic view showing the structure of a permanent magnet in FIG. 1.

Reference is made to FIG. 5. The permanent magnet 12 is embodied as a magnetic tile with a certain thickness. The material of the permanent magnet 12 according to this embodiment includes neodymium iron boron (NdFeB), or other materials may be adopted. The permanent magnet 12 includes a first surface 121 and a second surface 122, which have a large area, and a first side and a second side which are configured to connect the first surface 121 and the second surface 122. The first surface 121 is a concave surface and the second surface 122 is a convex surface. After the permanent magnet 12 is assembled with the rotor core 11, the first surface 121 is in contact with the rotor core 11, and the second surface 122 is away from the rotor core 11 with respect to the first surface 121. The second surface 122 includes a plane portion 1221 and convex portions 1222 located at two sides of the plane portion 1221 respectively. An area of the plane portion 1221 at least accounts for half an area of the second surface 122, the plane portion 1221 arranged in such a manner can improve a density of the magnetic flux of the permanent magnet 12, to allow a wave crest of a sinusoidal wave form, as the permanent magnet 12 is originally presented, to be flat and approximate to a square wave, which may meet requirements of square wave drive in the case that only a small change is made to the permanent magnet 12.

Figure 3:
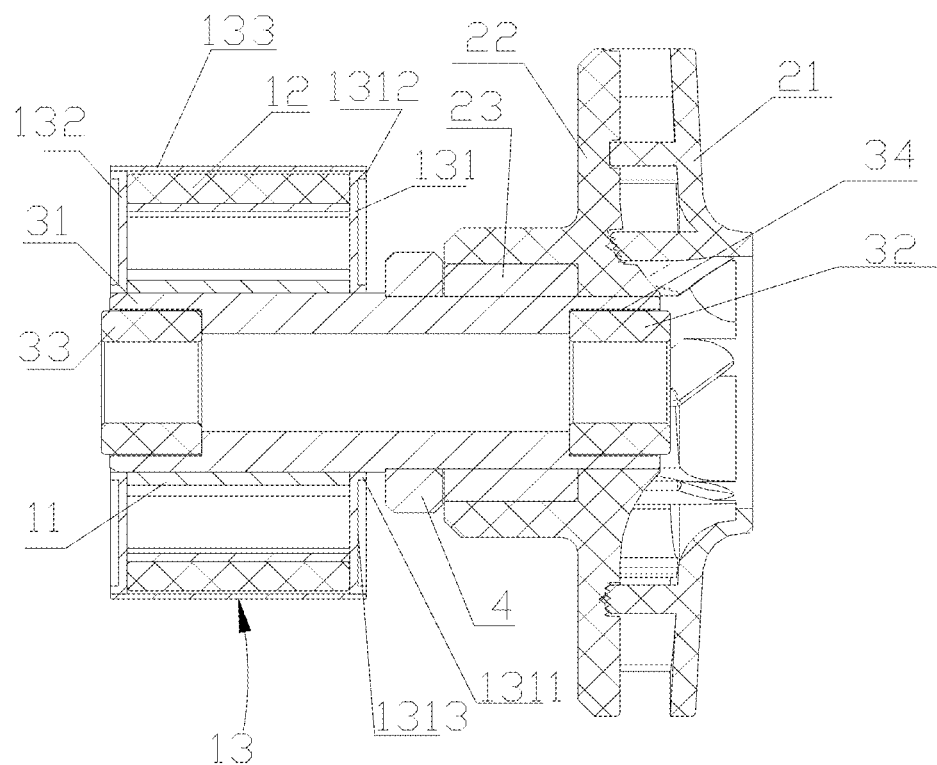
FIG. 3 is a sectional schematic view showing the structure of the rotor assembly in FIG. 1.
Figure 4:
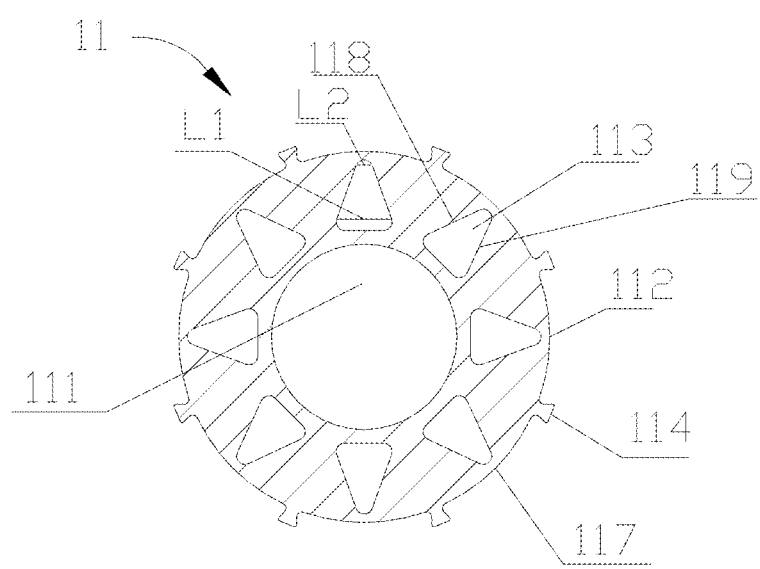
FIG. 4 is a schematic view showing the structure of an end surface of a rotor core of the rotor assembly in FIG. 1.

Reference is made to FIG. 3. In this embodiment, the shield 13 is made of metal, such as a stainless steel. The shield 13 includes an upper end plate 131, a lower end plate 132 and a sleeve 133, all of which are made of the stainless steel. The upper end plate 131, the lower end plate 132, the sleeve 133 and the outer circumferential surface of the shaft sleeve 31 are fixedly connected by welding to allow the rotor core 11 and the permanent magnet 12 to be fixed in the accommodating portion formed by the shield 13 and the shaft sleeve 31, and thus a relatively closed accommodating portion configured to receive the rotor core 11 and the permanent magnet 12 is formed.

In order to ensure that the rotor assembly 50 and the stator assembly 60 have a small air gap there between, a thickness of the sleeve 133 should be as small as possible. In this embodiment, a thickness of the upper end plate 131 is approximately equal to the thickness of the sleeve 133. The upper end plate 131 includes a first flanging 1311, a second flanging 1312, and a flat plate 1313 arranged between the first flanging 1311 and the second flanging 1312. The upper end plate 131 includes a center hole, and the first flanging 1311 is arranged around the center hole. The upper end plate 131 is sleeved on the outer circumferential surface of the shaft sleeve 31 through the center hole. The second flanging 1312 is formed on an outer edge of the upper end plate 131. The upper end plate 131 is in contact with the outer circumferential surface of the shaft sleeve 31 via the first flanging 1311. The first flanging 1311 is configured to be in a tight fit with the outer circumferential surface of the shaft sleeve 31, and is substantially perpendicular to the flat plate 1313. In this way, the first flanging 1311 allows a length of a fitting surface, through which the upper end plate 131 fits the shaft sleeve 31, to be increased, which may increase the fitting stability. The first flanging 1311 is fixed to the shaft sleeve 31 by welding. The second flanging 1312 may match with an inner circumferential surface or an outer circumferential surface of the sleeve 133, and the second flanging 1312 is substantially perpendicular to the flat plate 1313. The second flanging 1312 may increase a fitting length of the upper end plate 131 fitting the sleeve 133, and the second flanging 1312 is fixed to the sleeve 133 by welding. Of course, an extending direction of the first flanging 1311 may be the same or not the same as an extending direction of the second flanging 1312, which may both increase the fitting length. In this embodiment, the first flanging 1311 and the second flanging 1312 are configured to have the same extending direction in order to achieve a simple process. Also, in this embodiment, the structures of the upper end plate 131 and the lower end plate 132 are the same, which may reduce parts and moulds, and lower the manufacturing cost. In this embodiment, the shield 13 includes the upper end plate 131, the sleeve 133 and the lower end plate 132, which are separately formed. Apparently, the sleeve 133 may be integrally formed with the upper end plate 131, or with the lower end plate 132, thus may reduce one welding portion. In this embodiment, the upper end plate 131, the lower end plate 132 and the sleeve 133 which are separately formed are adopted, the shield 13 in such a manner may be conveniently mounted to the shaft sleeve 31. Of course, in the case that the thicknesses of the upper end plate 131 and the lower end plate 132 are large, the upper end plate 131 and the lower end plate 132 may not include a flanging.

Reference is made to FIG. 3. The impeller 2 includes an upper plate 21, a lower plate 22 and a bushing 23. The bushing 23 is made of a metal material, and a lower plate assembly including the lower plate 22 may be formed by injection-molding taking the bushing 23 as an insert. The upper plate 21 is fixed to the lower plate assembly, including the bushing 23 and the lower plate 22, by ultrasonic welding.

Figure 7:
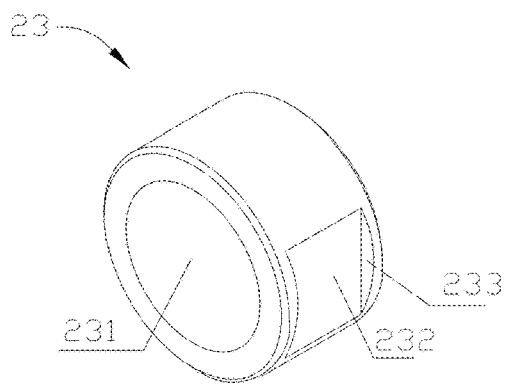
FIG. 7 is a schematic view showing the structure of a bushing of an impeller according to an embodiment.
Figure 8:
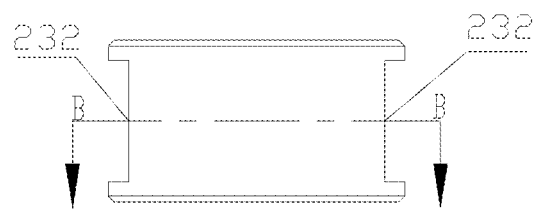
FIG. 8 is a front schematic view showing the structure of the bushing in FIG. 7.
Figure 9:
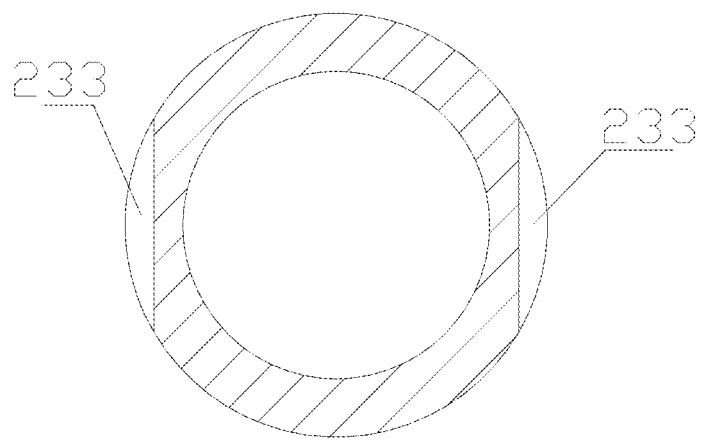
FIG. 9 is a sectional schematic view showing the structure of the bushing in FIG. 8 taken along line B-B.

Reference is made to FIGS. 7 to 9. The bushing 23 has a second center hole 231, and planes 232 distributed uniformly with respect to an axis of the second center hole 231 are formed on an outer peripheral surface of the bushing 23. In this embodiment, a number of the planes 232 is two, and the two planes 232 are generally symmetrical about the axis of the second center hole 231, which may keep a dynamic balance of the impeller 2. Apparently, the number of the planes 232 may also be four or other even numbers, to allow the planes 232 to be uniformly distributed on the outer peripheral surface of the bushing 23. The bushing 23 is provided with flanges 233 at two ends of each of the planes 232, in this way, when the lower plate assembly is formed by injection molding taking the bushing 23 as the insert, the planes 232 may restrict rotating of the bushing 23 in a circumferential direction relative to the lower plate 22, and the flanges 233 may restrict moving of the bushing 23 in the axial direction relative to the lower plate 22.

Reference is made to FIGS. 2 and 3. The shaft sleeve assembly 3 includes the shaft sleeve 31, the first bearing 32, the second bearing 33 and the buffer 34. The impeller 2 and the rotor 1 are connected as a whole by the shaft sleeve 31, and the shaft sleeve 31 is a connecting member herein. The rotor assembly 50 is sleeved on the circumferential surface of the shaft 40 by the first bearing 32 and the second bearing 33, and may rotate about the shaft 40. Each of inner circumferential surfaces at two ends, of the shaft sleeve 31 has an inner step portion, and the first bearing 32 and the second bearing 33 are limited by the corresponding inner step portions respectively. In this embodiment, two buffers 34 are included, which are respectively arranged between an outer circumferential surface of the first bearing 32 and an inner circumferential surface of the shaft sleeve 31, and arranged between the outer circumferential surface of the second bearing 33 and the inner circumferential surface of the shaft sleeve 31.

Figure 10:
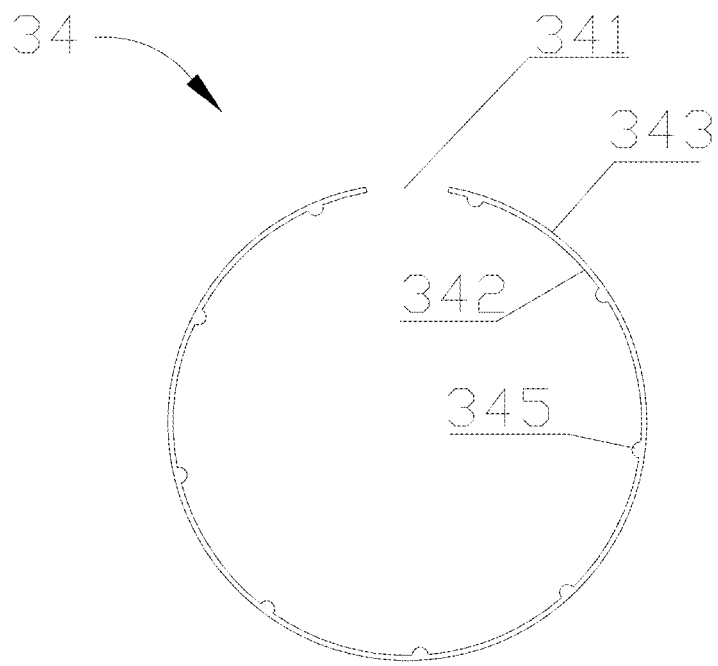
FIG. 10 is a schematic view showing the structure of an end surface of a buffer in FIG. 2.

Reference is made to FIG. 10. The buffer 34 is made of a stainless steel and is generally in a cylindrical shape. The buffer 34 has a gap portion 341, and includes an inner peripheral surface 342 and an outer peripheral surface 343. Also, the buffer has a certain elasticity. Multiple protrusions are distributed on the inner peripheral surface 342 of the buffer 34, and the protrusions include protruding ribs 345 extending in an axial direction of the buffer 34, and each of the protruding ribs 345 is configured to protrude from the inner peripheral surface 342 of the buffer 34 to an inside of the buffer. The outer peripheral surfaces of the two buffers 34 are in contact with side walls of the respective step portions of the shaft sleeve 31, and the protruding ribs 345 on the inner peripheral surfaces of the two buffers 34 are in contact with the outer circumferential surface of the first bearing 32 and the outer circumferential surface of the second bearing 33 respectively. In this way, since the buffer 34 has a certain elasticity, the shaft 40 is in contact with the first bearing 32 and the second bearing 33 by means of the protruding ribs 345. In the case that a small deflection occurs to the rotor assembly 50 when the rotor assembly 50 is rotating and being assembled, the buffer 34, by the elasticity thereof, may perform centering to the rotor assembly 50, and absorb a slight vibration of the rotor assembly 50, which facilitates reduction of noise.

The rotor assembly further includes a balancing sleeve 4. Reference is made to FIGS. 2 and 3, the balancing sleeve 4 is sleeved on the outer circumferential surface of the shaft sleeve 31, and is arranged between the impeller 1 and the rotor 2. The balancing sleeve 4 is made of a metal material, and a brass material may be alternatively selected. An outer step surface is formed on the outer circumferential surface of the shaft sleeve 31. The balancing sleeve 4 has one end surface abutting against the outer step surface of the shaft sleeve 31 and another end surface abutting against the impeller 1. Since the balancing sleeve 4 is made of the brass material, a mass distribution of the rotor assembly 50 may be adjusted by punching holes in the balancing sleeve 4, and further a dynamic balance of the rotor assembly 50 is adjusted.

A rotor assembly includes a rotor, an impeller and a shaft sleeve assembly. The rotor includes a rotor core, a permanent magnet, and a shield. The impeller includes an upper plate and a lower plate assembly, and the shaft sleeve assembly includes a shaft sleeve and bearings. The method for manufacturing the rotor assembly includes the following steps.

Step 1 includes processing or preparing parts. The parts include the rotor core, the permanent magnet, parts for constituting the shield, the impeller, the shaft sleeve and the bearings.

Step 2 includes assembling the parts, which mainly includes assembling the rotor. The assembling of the rotor includes assembling the rotor core with the shaft sleeve to form a tight fit between the rotor core and the shaft sleeve, fixing the permanent magnet to the rotor core, assembling the shield with an assembled unit formed by the permanent magnet and the rotor core, and fixing the parts of the shield by welding and fixing the shield to the shaft sleeve by welding.

Step 3 includes assembling a rotor assembly, which includes: pressing the impeller to another end of the shaft sleeve that is opposite to the end of the shaft sleeve on which the rotor is fixed; and pressing fit and fixing the bearing with the shaft sleeve, or, press-fitting and fixing the bearing with a buffer and the shaft sleeve.

In step 1, the rotor core is formed by stacking and riveting multiple silicon steel sheets, and the rotor core has permanent magnet position-limiting grooves which are distributed uniformly in an outer peripheral surface of the rotor core.

Furthermore, the rotor assembly may further include a buffer, and the buffer is arranged between the shaft sleeve and the bearing. In this case, step 1 further includes preparing the buffer, and step 3 further includes fitting the buffer between the shaft sleeve and the bearing.

Besides, the rotor assembly may further include a balancing sleeve, the balancing sleeve is made of a brass material, and the balancing sleeve is fixedly sleeved on the shaft sleeve. The balancing sleeve is arranged between the impeller and the rotor, the shaft sleeve is provided with an outer step portion, and the balancing sleeve has one end surface in contact with the outer step portion and another end surface which may function as an axial positioning portion when the impeller is assembled to the rotor.

The shield may include a sleeve and an end plate, accordingly step 1 includes forming the sleeve and the end plate, and the end plate is fixed to the shaft sleeve by welding, and the end plate is fixed to the sleeve by welding.

It should be noted that, the above embodiments are only intended for describing the present application, and should not be interpreted as limitation to the technical solutions of the present application. Although the present application is described in detail in conjunction with the above embodiments, it should be understood by those skilled in the art that, modifications or equivalent substitutions may still be made to the present application by those skilled in the art; and any technical solutions and improvements of the present application without departing from the spirit and scope thereof also fall into the scope of the present application defined by the claims.

The invention claimed is:

1. An electrically driven pump, comprising a first housing, a second housing, a partition, a stator assembly, a circuit board and a rotor assembly, wherein the electrically driven pump comprises a pump chamber, the pump chamber comprises a space defined by the first housing and the second housing, the pump chamber is divided, by the partition, into a dry chamber and a wet chamber, the rotor assembly is arranged in the wet chamber, and the stator assembly and the circuit board are arranged in the dry chamber, wherein:

the rotor assembly comprises an impeller, a rotor and a shaft sleeve assembly, and each of the impeller, the rotor and the shaft sleeve assembly is separately formed, the shaft sleeve assembly comprises a shaft sleeve, the impeller is arranged on one end of the shaft sleeve, and the rotor is arranged on another end of the shaft sleeve; and the rotor comprises a permanent magnet, a rotor core and a shield, the permanent magnet is fixed to the rotor core, the rotor core is fixed to the shaft sleeve, the shield and the shaft sleeve are both made of metal, welded together to form a closed accommodating portion between the shield and an outer circumferential surface of the shaft sleeve, and the permanent magnet is fixedly arranged in the accommodating portion; wherein the shield comprises an upper end plate, a lower end plate and a shield sleeve, all of which are made of stainless steel, and the upper end plate, the lower end plate, the shield sleeve and the outer circumferential surface of the shaft sleeve are fixedly connected by welding to allow the rotor core and the permanent magnet to be fixed in the accommodating portion formed by the shield and the shaft sleeve, the upper end plate comprises a first protrusion, a second protrusion, and a flat plate arranged between the first protrusion and the second protrusion, the upper end plate comprises a center hole, and the first protrusion is arranged around the center hole, and the upper end plate is sleeved on the outer circumferential surface of the shaft sleeve through the center hole, and the second protrusion is formed on an outer edge of the upper end plate, the upper end plate is in contact with the outer circumferential surface of the shaft sleeve via the first protrusion, the second protrusion is formed on an outer edge of the upper end plate and the second protrusion is in contact with an inner circumferential surface or an outer circumferential surface of the shield sleeve, wherein the impeller comprises a bushing, the bushing is made of metal, a plane and a flange are formed on an outer peripheral surface of the bushing, an inner peripheral surface of the bushing is a cylindrical surface, the inner peripheral surface of the bushing matches with the shaft sleeve, and the outer peripheral surface of the bushing is fixedly connected to an injection molded body of the impeller.

2. The electrically driven pump according to claim 1, wherein the rotor core comprises protruding ribs, the protruding ribs are formed on an outer peripheral surface of the rotor core and are uniformly distributed along the outer peripheral surface of the rotor core, the permanent magnet is arranged between the protruding ribs that are adjacent, and the number of the permanent magnet is equal to the number of the protruding ribs.

3. The electrically driven pump according to claim 1, wherein the rotor core comprises protruding ribs, the protruding ribs are formed on an outer peripheral surface of the rotor core and are uniformly distributed along the outer peripheral surface of the rotor core, the permanent magnet is arranged between the protruding ribs that are adjacent, and the number of the permanent magnet is equal to the number of the protruding ribs.

4. The electrically driven pump according to claim 2, wherein the rotor core comprises a plurality of through holes distributed uniformly in a circumferential direction of the rotor core, the through holes are arranged to pass through two ends of the rotor core, the number of the through holes is less than or equal to the number of the protruding ribs, each of the through holes is located at a position of a connecting line, which connects the center of the rotor core and the middle of an interval between the protruding ribs that are adjacent, and each of the through holes is arranged to be symmetrical about the connecting line.

5. The electrically driven pump according to claim 4, wherein the rotor core comprises a first portion and a second portion which are configured to form the through hole, the first portion and the second portion are symmetrical about the connecting line, the first portion and second portion extend in a direction from an inner peripheral surface towards the outer peripheral surface of the rotor core; and a circle is defined by taking the center of the rotor core as the circle center, the circle intersects with the first portion and the second portion respectively, an intersection of the circle intersecting with the first portion is a first intersection, an intersection of the circle intersecting with the second portion is a second intersection, and a length of an arc between the first intersection and the second intersection is gradually decreased from the inner peripheral surface to the outer peripheral surface of the rotor core.

6. The electrically driven pump according to claim 1, wherein the permanent magnet comprises a first surface and a second surface, the first surface is a concave surface and is in contact with the outer peripheral surface of the rotor core, the second surface is located away from the rotor core with respect to the first surface; and the second surface comprises a first convex surface portion, a second convex surface portion and a plane portion, the plane portion is arranged at a middle portion of the second surface, and the first convex surface portion and the second convex surface portion are arranged at two sides of the plane portion respectively.

7. The electrically driven pump according to claim 4, wherein the shaft sleeve assembly further comprises bearings, the bearings comprise a first bearing and a second bearing, a first step portion and a second step portion are formed on the shaft sleeve, the first step portion is arranged to be close to the impeller, the second step portion is arranged to be close to the rotor, the first step portion comprises a first step surface and a first side wall, the second step portion comprises a second step surface and a second side wall, the first bearing is mounted on the first step portion, and the second bearing is mounted on the second step portion.

8. The electrically driven pump according to claim 5, wherein the shaft sleeve assembly further comprises bearings, the bearings comprise a first bearing and a second bearing, a first step portion and a second step portion are formed on the shaft sleeve, the first step portion is arranged to be close to the impeller, the second step portion is arranged to be close to the rotor, the first step portion comprises a first step surface and a first side wall, the second step portion comprises a second step surface and a second side wall, the first bearing is mounted on the first step portion, and the second bearing is mounted on the second step portion.

9. An electrically driven pump, comprising a first housing, a second housing, a partition, a stator assembly, a circuit board and a rotor assembly, wherein the electrically driven pump comprises a pump chamber, the pump chamber comprises a space defined by the first housing and the second housing, the pump chamber is divided, by the partition, into a dry chamber and a wet chamber, the rotor assembly is arranged in the wet chamber, and the stator assembly and the circuit board are arranged in the dry chamber, wherein:

the rotor assembly comprises an impeller, a rotor and a shaft sleeve assembly, and each of the impeller, the rotor and the shaft sleeve assembly is separately formed, the shaft sleeve assembly comprises a shaft sleeve, the impeller is arranged on one end of the shaft sleeve, and the rotor is arranged on another end of the shaft sleeve; and the rotor comprises a permanent magnet, a rotor core and a shield, the permanent magnet is fixed to the rotor core, the rotor core is fixed to the shaft sleeve, the shield and the shaft sleeve are both made of metal, welded together to form a closed accommodating portion between the shield and an outer circumferential surface of the shaft sleeve, and the permanent magnet is fixedly arranged in the accommodating portion;

wherein the shield comprises an upper end plate, a lower end plate and a shield sleeve, all of which are made of stainless steel, and the upper end plate, the lower end plate, the shield sleeve and the outer circumferential surface of the shaft sleeve are fixedly connected by welding to allow the rotor core and the permanent magnet to be fixed in the accommodating portion formed by the shield and the shaft sleeve, the upper end plate comprises a first protrusion, a second protrusion, and a flat plate arranged between the first protrusion and the second protrusion, the upper end plate comprises a center hole, and the first protrusion is arranged around the center hole, and the upper end plate is sleeved on the outer circumferential surface of the shaft sleeve through the center hole, and the second protrusion is formed on an outer edge of the upper end plate, the upper end plate is in contact with the outer circumferential surface of the shaft sleeve via the first protrusion, the second protrusion is formed on an outer edge of the upper end plate and the second protrusion is in contact with an inner circumferential surface or an outer circumferential surface of the shield sleeve, wherein the shaft sleeve assembly further comprises bearings, the bearings comprise a first bearing and a second bearing, a first step portion and a second step portion are formed on the shaft sleeve, the first step portion is arranged to be close to the impeller, the second step portion is arranged to be close to the rotor, the first step portion comprises a first step surface and a first side wall, the second step portion comprises a second step surface and a second side wall, the first bearing is mounted on the first step portion, and the second bearing is mounted on the second step portion, wherein the shaft sleeve assembly further comprises, one buffer or two buffers; if there is one buffer, the buffer is arranged between the first bearing and the shaft sleeve, or between the second bearing and the shaft sleeve; or if there are two buffers, one buffer is arranged between the first bearing and the shaft sleeve, and the other buffer is arranged between the second bearing and the shaft sleeve; each buffer of the one buffer or two buffers has a gap structure, a protrusion structure formed on an inner peripheral surface, and the protrusion structure is in contact with an outer circumferential surface of the bearings, and the outer peripheral surface of the buffer is in contact with the shaft sleeve.

10. An electrically driven pump, comprising a first housing, a second housing, a partition, a stator assembly, a circuit board and a rotor assembly, wherein the electrically driven pump comprises a pump chamber, the pump chamber comprises a space defined by the first housing and the second housing, the pump chamber is divided, by the partition, into a dry chamber and a wet chamber, the rotor assembly is arranged in the wet chamber, and the stator assembly and the circuit board are arranged in the dry chamber, wherein:

the rotor assembly comprises an impeller, a rotor and a shaft sleeve assembly, and each of the impeller, the rotor and the shaft sleeve assembly is separately formed, the shaft sleeve assembly comprises a shaft sleeve, the impeller is arranged on one end of the shaft sleeve, and the rotor is arranged on another end of the shaft sleeve; and the rotor comprises a permanent magnet, a rotor core and a shield, the permanent magnet is fixed to the rotor core, the rotor core is fixed to the shaft sleeve, the shield and the shaft sleeve are both made of metal, welded together to form a closed accommodating portion between the shield and an outer circumferential surface of the shaft sleeve, and the permanent magnet is fixedly arranged in the accommodating portion;

wherein the shield comprises an upper end plate, a lower end plate and a shield sleeve, all of which are made of stainless steel, and the upper end plate, the lower end plate, the shield sleeve and the outer circumferential surface of the shaft sleeve are fixedly connected by welding to allow the rotor core and the permanent magnet to be fixed in the accommodating portion formed by the shield and the shaft sleeve, the upper end plate comprises a first protrusion, a second protrusion, and a flat plate arranged between the first protrusion and the second protrusion, the upper end plate comprises a center hole, and the first protrusion is arranged around the center hole, and the upper end plate is sleeved on the outer circumferential surface of the shaft sleeve through the center hole, and the second protrusion is formed on an outer edge of the upper end plate, the upper end plate is in contact with the outer circumferential surface of the shaft sleeve via the first protrusion, the second protrusion is formed on an outer edge of the upper end plate and the second protrusion is in contact with an inner circumferential surface or an outer circumferential surface of the shield sleeve, wherein the rotor assembly further comprises a balancing sleeve, the balancing sleeve is made of a metal material, the balancing sleeve is sleeved on the shaft sleeve, and the balancing sleeve is arranged between the impeller and the rotor; and an outer step surface is formed on an outer circumferential surface of the shaft sleeve, and the balancing sleeve has one end surface abutting against the outer step surface and another end surface functioning as a positioning portion in axially mounting the impeller.

11. A method for manufacturing the electrically driven pump according to claim 1, wherein the manufacturing process of the rotor assembly comprises following steps: step 1, processing or preparing parts, wherein the parts comprise the rotor core, the permanent magnet, the shield, the impeller, the shaft sleeve and the bearings; step 2, assembling the parts, comprising assembling the rotor, wherein the assembling of the rotor comprises: fitting the rotor core with the shaft sleeve to form a tight fit between the rotor core and the shaft sleeve, fixing the permanent magnet to the rotor core, covering the shield on an outer peripheral surface of the permanent magnet, and fixing the shield to the shaft sleeve by welding; and step 3, assembling the rotor assembly, comprising: tightly pressing the impeller against one end of the shaft sleeve, that is opposite to another end of the shaft sleeve where the rotor is fixed, and pressing and fixing the bearing to the shaft sleeve.

* * * * *